(12) United States Patent
Coskun et al.

(10) Patent No.: US 8,627,473 B2
(45) Date of Patent: Jan. 7, 2014

(54) PEER-TO-PEER (P2P) BOTNET TRACKING AT BACKBONE LEVEL

(75) Inventors: Baris Coskun, Weehawken, NJ (US); Arati Baliga, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 386 days.

(21) Appl. No.: 13/155,761

(22) Filed: Jun. 8, 2011

(65) Prior Publication Data

US 2012/0317641 A1    Dec. 13, 2012

(51) Int. Cl.
*G06F 21/00* (2013.01)
*H04L 29/06* (2006.01)

(52) U.S. Cl.
USPC .............................................. 726/23; 726/25

(58) Field of Classification Search
None
See application file for complete search history.

(56) References Cited

U.S. PATENT DOCUMENTS

| | | | |
|---|---|---|---|
| 2005/0149759 A1* | 7/2005 | Vishwanath et al. | 713/201 |
| 2006/0176822 A1* | 8/2006 | Doyle et al. | 370/241 |
| 2008/0080518 A1* | 4/2008 | Hoeflin et al. | 370/395.42 |
| 2010/0054128 A1 | 3/2010 | O'Hern | |
| 2010/0162396 A1 | 6/2010 | Liu et al. | |
| 2010/0202299 A1 | 8/2010 | Strayer et al. | |

OTHER PUBLICATIONS

Nagaraja et al., "BotGrep: Finding P2P Bots with Structured Graph Analysis," University of Illinois at Urbana-Champaign, available at http://www.usenix.org/events/sec10/tech/full_papers/Nagaraja.pdf (accessed on Dec. 23, 2010).
Coskun et al., "Friends of an Enemy: Identifying Local Members of Peer-to-Peer Botnets Using Mutual Contacts," ACSAC '10, Austin, Texas, Dec. 6, 2010.

* cited by examiner

*Primary Examiner* — Kaveh Abrishamkar
*Assistant Examiner* — Tri Tran
(74) *Attorney, Agent, or Firm* — Greenblum & Bernstein, P.L.C.

(57) ABSTRACT

A method, computer-readable medium, and system for analyzing backbone traffic to determine compromised hosts from among hosts on a network are provided. The backbone traffic includes data flows. Each of the data flows is analyzed to determine peer-to-peer data flows from among the data flows. Each of the peer-to-peer data flows is one of the data flows having a source address and a destination address that are each unassociated with a domain name. The peer-to-peer data flows are analyzed to determine the compromised hosts from among the hosts. Each of the compromised hosts is interconnected with another of the compromised hosts via at least one of the peer-to-peer data flows.

19 Claims, 5 Drawing Sheets

PEER-TO-PEER (P2P) BOTNET TRACKING AT BACKBONE LEVEL

BACKGROUND

1. Field of the Disclosure

The present disclosure generally relates to network security. More specifically, the present disclosure relates to identifying bots within a botnet.

2. Background Information

Botnets are networks of compromised hosts. Botnets pose a significant threat to both a network's infrastructure and its customers. Therefore, it is important for an Internet Service Provider to detect and track botnet members, i.e., bots.

Botnets generally include a bot master that manages a botnet by sending commands to each of the bots within the botnet. In order for the botnet to function properly, the bot master must be able to communicate with each of the bots and send them commands through a command and control channel.

Traditional botnets generally adopted a centralized command and control architecture to communicate commands from the bot master to each of the bots. In a centralized command and control architecture, the bot master publishes commands at a central location, such as a specific IP address, a specific IRC channel, a specific domain name, etc. Thereafter, each of the bots fetches the commands from the central location.

Modern botnets have adopted new command and control architectures. For example, new botnets often adopt a peer-to-peer command and control architecture to distribute commands amongst each of the bots. In the peer-to-peer command and control architecture, there is no centralized controller. Instead, the bot master simply injects a command into the botnet at any arbitrary point. The injected command is disseminated through the botnet amongst the bots using various peer-to-peer protocols.

DETAILED DESCRIPTION

Figure 1:
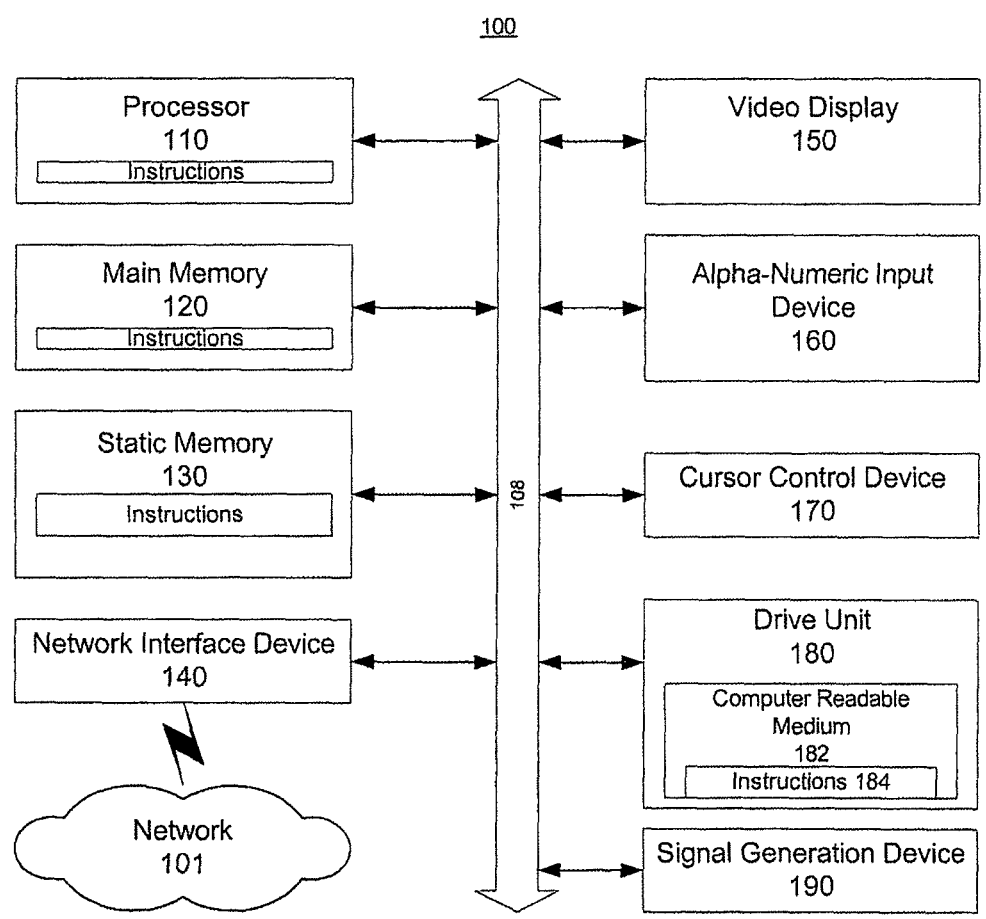
FIG. 1 shows an exemplary general computer system that includes a set of instructions for analyzing backbone traffic to determine a plurality of compromised hosts from among a plurality of hosts on a network.

In view of the foregoing, the present disclosure, through one or more of its various aspects, embodiments and/or specific features or sub-components, is thus intended to bring out one or more of the advantages as specifically noted below.

According to an embodiment of the present disclosure, a method analyzes backbone traffic to determine a plurality of compromised hosts from among a plurality of hosts on a network. The backbone traffic includes a plurality of data flows. The method analyzes each of the data flows included in the backbone traffic to determine a plurality of peer-to-peer data flows. Each of the peer-to-peer data flows is one of the data flows that has a source address and a destination address that are each unassociated with a domain name. The method analyzes, with a processor, the peer-to-peer data flows to determine the compromised hosts from among the hosts. Each of the compromised hosts is interconnected with another of the compromised hosts via at least one of the peer-to-peer data flows.

According to one aspect of the present disclosure, at least two of the compromised hosts are predetermined compromised hosts. In this regard, the peer-to-peer data flows are analyzed to determine at least one path that interconnects the predetermined compromised hosts. The path includes at least two of the peer-to-peer data flows, and the compromised hosts are on the path that interconnects the predetermined compromised hosts.

According to another aspect of the present disclosure, at least two of the compromised hosts are predetermined compromised hosts. In this regard, the method graphs the peer-to-peer data flows on a communication graph with each of the hosts being a node and each of the peer-to-peer data flows being an edge. The method further determines, with a predetermined graph algorithm, whether the communication graph defines at least one path that interconnects the predetermined compromised hosts. The path includes at least two of the peer-to-peer data flows. Furthermore, the path that interconnects the predetermined compromised hosts on the communication graph is analyzed to determine the compromised hosts from among the hosts in response to determining that the communication graph defines the path.

According to an additional aspect of the present disclosure, at least one of the compromised hosts is not on a path that interconnects the predetermined compromised hosts. The one of the compromised hosts is determined based on a proximity to at least one of the predetermined compromised hosts.

According to yet another aspect of the present disclosure, the method determines whether the communication graph defines at least one additional path that interconnects two of the plurality of compromised hosts other than the predetermined compromised hosts. The at least one additional path includes at least two of the plurality of peer-to-peer data flows. In this regard, the method analyzes the additional path that interconnects the two of the compromised hosts other than the predetermined compromised hosts to determine the compromised hosts from among the hosts in response to determining that the communication graph defines the additional path.

According to still another aspect of the present disclosure, the method assigns a probability to each of the hosts that is located on the path based upon a relationship with one of the path and the predetermined compromised hosts in response to determining that the communication graph defines the path. The probability of each of the hosts that is located on the path is analyzed to determine the compromised hosts from among the hosts.

According to another aspect of the present disclosure, the method tracks the path for a predetermined period of time to determine at least one of dynamic information of the compromised hosts and at least one additional compromised host in response to determining that the communication graph defines the path.

According to yet another aspect of the present disclosure, the method graphs the peer-to-peer data flows on a communication graph with each of the hosts being a node and each of the peer-to-peer data flows being an edge. In this regard, at least one of the compromised hosts is a predetermined compromised host, and the communication graph is analyzed to determine the compromised hosts based on a proximity to the predetermined compromised host.

According to still another aspect of the present disclosure, each of the data flows is analyzed to determine the peer-to-peer data flows by searching a database of domain name system records to determine whether the source address and the destination address of each of the data flows are each unassociated with the domain name.

According to an additional aspect of the present disclosure, each of the data flows is analyzed to determine the peer-to-peer data flows by performing reverse domain name system queries to determine whether the source address and the destination address of each of the data flows are each unassociated with the domain name.

According to another embodiment of the present disclosure, a non-transitory computer-readable medium includes an executable program that analyzes backbone traffic to determine a plurality of compromised hosts from among a plurality of hosts on a network. The backbone traffic includes a plurality of data flows. The non-transitory computer-readable medium includes a resolving code segment that, when executed, analyzes each of the data flows included in the backbone traffic to determine a plurality of peer-to-peer data flows. Each of the peer-to-peer data flows is one of the data flows that has a source address and a destination address that are each unassociated with a domain name. The non-transitory computer-readable medium also includes a peer-to-peer data flow analyzing code segment that, when executed, analyzes the peer-to-peer data flows to determine the compromised hosts from among the hosts. Each of the compromised hosts being interconnected with another of the compromised hosts via at least one of the peer-to-peer data flows.

According to another aspect of the present disclosure, at least two of the compromised hosts are predetermined compromised hosts. A graphing code segment, when executed, graphs the peer-to-peer data flows on a communication graph with each of the hosts being a node and each of the peer-to-peer data flows being an edge. A path determining code segment that, when executed, determines, with a predetermined graph algorithm, whether the communication graph defines at least one path that interconnects the predetermined compromised hosts. The path includes at least two of the peer-to-peer data flows, and the peer-to-peer data flow analyzing code segment analyzes the path that interconnects the predetermined compromised hosts on the communication graph to determine the compromised hosts from among the hosts in response to the path determining code segment determining that the communication path defines the path.

According to still another aspect of the present disclosure, at least one of the compromised hosts is not on a path that interconnects the predetermined compromised hosts. The peer-to-peer data flow analyzing code segment determines the compromised host that is not on a path that interconnects the predetermined compromised hosts based on a proximity to at least one of the predetermined compromised hosts.

According to yet another aspect of the present disclosure, the path determining code segment further determines whether the communication graph defines at least one additional path that interconnects two of the compromised hosts other than the predetermined compromised hosts, the additional path including at least two of the peer-to-peer data flows. Furthermore, the peer-to-peer data flow analyzing code segment analyzes the additional path that interconnects the two of the compromised hosts other than the predetermined compromised hosts to determine the compromised hosts from among the hosts in response to the path determining code segment determining that the communication path defines the additional path.

According to an additional aspect of the present disclosure, a graphing code segment, when executed, graphs the peer-to-peer data flows on a communication graph with each of the hosts being a node and each of the peer-to-peer data flows being an edge. In this regard, at least one of the compromised hosts is a predetermined compromised host, and the peer-to-peer data flow analyzing code segment analyzes the communication graph to determine the compromised hosts based on a proximity to the predetermined compromised host.

According to another embodiment of the present disclosure, a system analyzes backbone traffic to determine a plurality of compromised hosts from among a plurality of hosts on a network. The backbone traffic includes a plurality of data flows. The system includes a resolver that analyzes each of the data flows included in the backbone traffic to determine a plurality of peer-to-peer data flows. Each of the peer-to-peer data flows is one of the data flows that has a source address and a destination address that are each unassociated with a domain name. The system further includes a processor that analyzes the peer-to-peer data flows to determine the compromised hosts from among the hosts. Each of the compromised hosts is interconnected with another of the compromised hosts via at least one of the peer-to-peer data flows.

According to another aspect of the present disclosure, at least two of the compromised hosts are predetermined compromised hosts. The system further includes a graphics processor that graphs the peer-to-peer data flows on a communication graph with each of the hosts being a node and each of the peer-to-peer data flows being an edge. An algorithm processor executes a predetermined graph algorithm to determine whether the communication graph defines at least one path that interconnects the predetermined compromised hosts. The path includes at least two of the peer-to-peer data flows. In this regard, the central processor analyzes the path that interconnects the predetermined compromised hosts on the communication graph to determine the compromised hosts from among the hosts in response to the algorithm processor determining that the communication path defines the path.

According to still another aspect of the present disclosure, at least one of the compromised hosts is not on a path that interconnects the predetermined compromised hosts. The central processor determined the one of the compromised hosts that is not on a path that interconnects the predetermined compromised hosts based on a proximity to at least one of the predetermined compromised hosts.

According to yet another aspect of the present disclosure, the algorithm processor determines whether the communication graph defines at least one additional path that interconnects two of the compromised hosts other than the predetermined compromised host. The additional path includes at least two of the peer-to-peer data flows. In this regard, the central processor analyzes the additional path that interconnects the two of the compromised hosts other than the predetermined compromised hosts to determine the compromised hosts from among the hosts in response to the algorithm processor determining that the communication path defines the additional path.

According to an additional aspect of the present disclosure, a graphics processor graphs the peer-to-peer data flows on a communication graph with each of the hosts being a node and each of the peer-to-peer data flows being an edge. In this regard, at least one of the compromised hosts is a predetermined compromised host, and the central processor analyzes the communication graph to determine the compromised hosts based on a proximity to the predetermined compromised host.

FIG. 1 is an illustrative embodiment of a general computer system, on which a method for analyzing backbone traffic to determine a plurality of compromised hosts from among a plurality of hosts may be implemented, which is shown and is designated 100. The computer system 100 may also include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
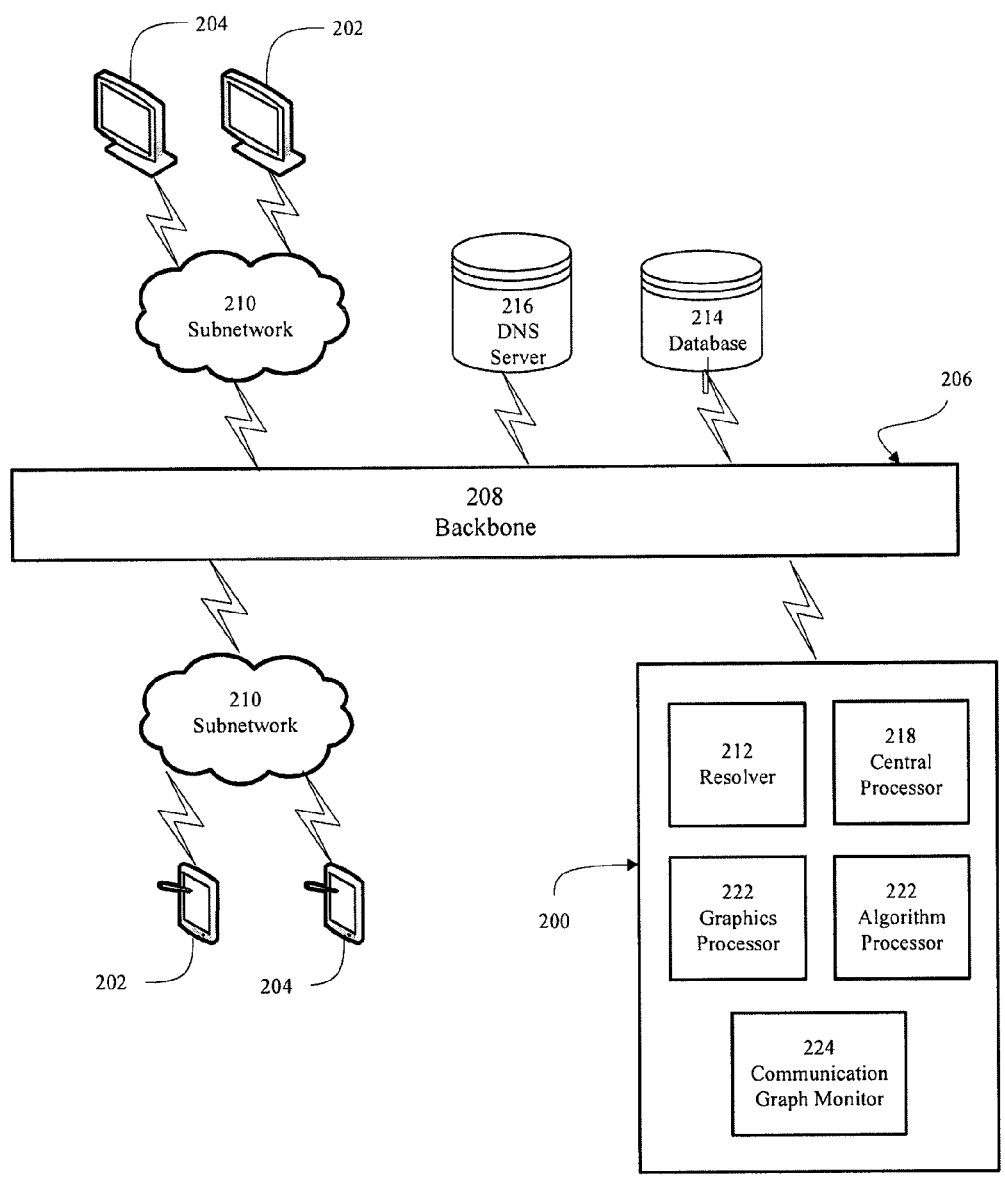
FIG. 2 is a schematic of an exemplary system for analyzing backbone traffic to determine a plurality of compromised hosts from among a plurality of hosts on a network, according to an aspect of the present disclosure.

A system 200 for analyzing backbone traffic to determine a plurality of compromised hosts 202 from among a plurality of hosts 202, 204 on a network 206 is generally indicated in FIG. 2. The compromised hosts 202 may be compromised, for example, via a bot. A bot is an application that runs automated tasks over the network 206. The bot may run illegal or illegitimate tasks, such as, but not limited to, denial of service attacks, spaming, phising, etc. Furthermore, the bots may be malicious bots, such as, for example, a virus and/or a worm. Alternatively, the bots may be benevolent bots, such as, for example, charitable bots. Of course, those skilled in the art appreciate that the bot may be any additional and/or alternative type of bot. Moreover, those skilled in the art appreciate that the compromised hosts 202 may be compromised via additional and/or alternative applications which communicate via the network 206.

The hosts 202, 204 on the network 206 include the compromised hosts 202 and uncompromised hosts 204. The hosts 202, 204 may include any device, or combination of devices, which is capable of connecting to and sending network communications via the network 206. For example, the hosts 202, 204 may be, but are not limited to, personal computers, laptop computers, tablet computers, personal data assistants, cellular telephones, servers, video game consoles, and the like. Of course, those skilled in the art understand that the above-listed devices are merely meant to be exemplary and are not intended to be exhaustive and/or exclusive.

Each of the hosts 202, 204 is capable of connecting to the network 206. The network 206 is generally indicated in FIG. 2 and includes a backbone 208 via which the backbone traffic, including the plurality of data flows, is sent. The backbone traffic sent to and from the hosts 202, 204 traverses the backbone 208.

In embodiments of the present application, the network 206 may further include multiple subnetworks 210. The subnetworks 210 may be of the same and/or different type and each connect to the backbone 208. The subnetworks 210 may be any type of network, such as, but not limited to, a local area network, a wide area network, a digital subscriber line network, a broadband cable access network, and the like. Of course, those skilled in the art appreciate that the above-mentioned subnetworks 210 and above-described network 206 are merely exemplary and are not meant o be limiting. Different embodiments of the present application may be employed in any type of network commonly known and understood in the art.

The system 200 analyzes the backbone traffic to determine the compromised hosts 202 from among the hosts 202, 204 on the network 206. The system 200 may be a standalone device or may be connected to other systems and/or peripheral devices. For example, the system 200 may include, or be included within, any one or more computers, servers, systems, and/or communication networks. In embodiments of the present application, the system 200 may be connected directly to the backbone 208 as shown in FIG. 2. Of course, in additional embodiments, the system 200 may be connected to the backbone 208 via one of the subnetworks 210.

The system 200 includes a resolver 212 that separates the data flows corresponding to peer-to-peer traffic from the rest of the non-peer-to-peer traffic. Specifically, the resolver 212 analyzes each of the data flows included within the backbone traffic to determine a plurality of peer-to-peer data flows. The peer-to-peer data flows are data flows between the hosts 202, 204. Each of the peer-to-peer data flows is determined as being one of the data flows that has a source address and a destination address that are each unassociated with a domain name. In other words, it is assumed that each of the hosts 202, 204 is not associated with a domain name, and thus, that peer-to-peer traffic may be determined as traffic between a source host and a destination host that each are not associated with a domain name.

In this regard, it is assumed that most non-peer-to-peer traffic involves domain name system resolution, e.g., traffic between at least one of a source address and a destination address that is associated with a domain name. That is, clients generally find servers by their domain names. On the other hand, bots embedded within compromised hosts of a peer-to-peer botnet cannot afford to register a domain name for each compromised host. As such, the bots communicate via peer-to-peer traffic. Therefore, the bots may be detected by analyzing only the peer-to-peer data flows of the backbone traffic.

In an embodiment of the present application, the resolver 212 may analyze the data flows to determine the peer-to-peer data flows by searching a database 214 of domain name system records to determine whether the source address and the destination address of each of the data flows are each unassociated with a domain name. According to such an embodiment, the database 214 may store all, or at least a portion, of the backbone traffic. In this regard, if either the source address or the destination address of one of the data flows is associated with a domain name, the source address or the destination address would have likely already been contacted using a domain name system query, and thus, a domain name system record for the domain name system query would be stored in the database 214. Accordingly, the resolver 212 may determine whether either the source address or the destination address of each of the data flows is associated with a domain name by searching the domain name system records that are stored in the database 214.

In an additional embodiment of the present application, the resolver 212 may analyze the data flows to determine the peer-to-peer data flows by performing reverse domain name system queries to determine whether the source address and the destination address of each of the data flows are each unassociated with a domain name. In this regard, the resolver 212 may perform the reverse domain name system queries in a domain name system server 216. The domain name system server 216 stores domain names in association with internet protocol addresses. As such, the resolver 212 may query the domain name system server 216 to determine whether a domain name is stored in association with the source address and the destination address of each of the data flows to determine the peer-to-peer data flows. Of course, those skilled in the art appreciate that the above-described embodiments by which the resolver 212 determines whether the peer-to-peer data flows are merely exemplary and are not limiting. The resolver 212 may determine the peer-to-peer data flows from the data flows in accordance with any procedure or method known in the art.

The system 200 includes a central processor 218 that analyzes the peer-to-peer data flows to determine the compromised hosts 202 from among the hosts 202, 204. Each of the compromised hosts 202 is determined as being interconnected with another one of the compromised hosts 202 via at least one of the peer-to-peer data flows. Bots of a peer-to-peer botnet that are embedded within compromised hosts communicate with one another to disseminate commands through the botnet. As such, when a group of hosts lie on a single path, the hosts may be identified as compromised hosts with a high probability.

According to an embodiment of the system 200, at least two of the compromised hosts 202 are predetermined compromised hosts. In embodiments of the present application, the predetermined compromised hosts may be detected based on abnormal or malicious activity. Additionally, or alternatively, the predetermined compromised hosts may be detected using a publicly available blacklist of known bots. Of course, those skilled in the art appreciate that the above-described methods of detecting the predetermined compromised hosts are merely exemplary and are not limiting. For example, the predetermined compromised hosts may be hosts 202, 204 that are intentionally compromised. That is, the predetermined compromised hosts may be intentionally infected or compromised with a known bot.

Figure 3:
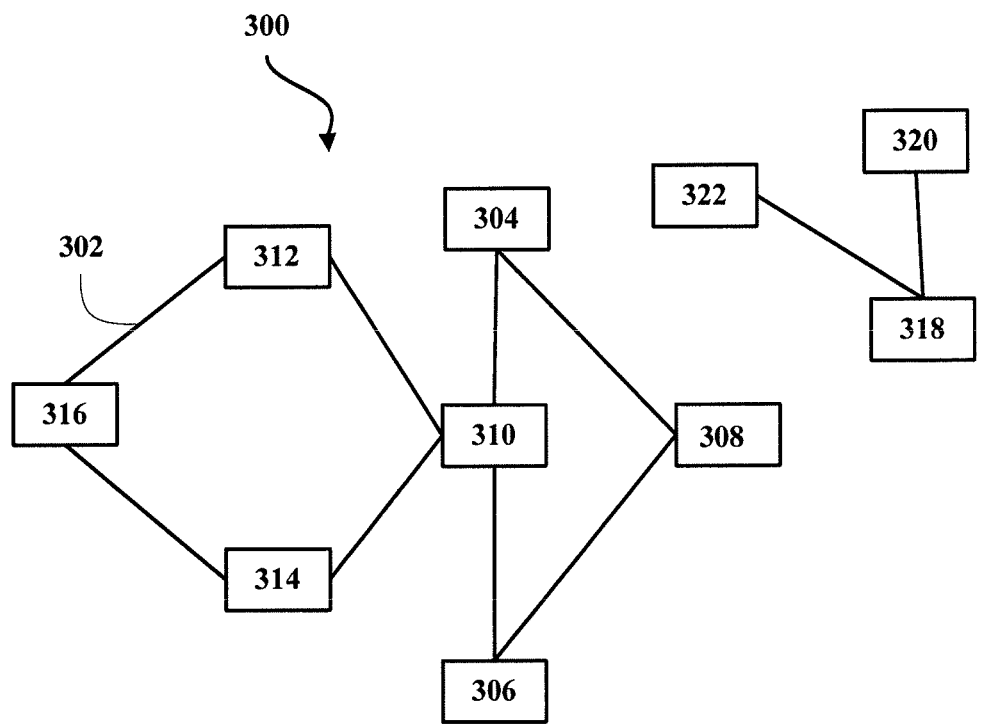
FIG. 3 is an exemplary communication graph showing a plurality of hosts and a plurality of peer-to-peer network flows for determining a plurality of compromised hosts from among the plurality of hosts, according to an aspect of the present disclosure.

The system 200 may further include a graphics processor 220 that graphs the peer-to-peer data flows on a communication graph. According to an embodiment of the present application, the communication graph may include each compromised host as a node and each of the peer-to-peer data flows as an edge. In this regard, according to an embodiment of the present application, the communication graph may be an undirected graph. An exemplary and non-limiting communication graph is generally shown in FIG. 3. As shown in FIG. 3, each of the peer-to-peer data flows 302 is an edge, and each of the hosts 304-322 is a node. Of course, those skilled in the art appreciate that the communication graph shown in FIG. 3 is merely exemplary and not meant to be limiting. Moreover, those skilled in the art appreciate that the graphics processor 220 may graph the plurality of peer-to-peer data flows on additional types of graphs and/or trees in addition, or alternatively, to directed graphs.

In the embodiment of the present application in which the compromised hosts 202 include two predetermined compromised hosts, the system 200 may include an algorithm processor 222 that executes a predetermined graph algorithm to determine whether the communication graph defines at least one path that interconnects the predetermined compromised hosts. The predetermined graph algorithm may be any type of graph algorithm known and understood in the art, such as, but not limited to, a shortest path algorithm and a spanning tree algorithm. In an embodiment of the present application, the path includes at least two of the peer-to-peer data flows for determining an additional, unknown compromised host between the predetermined compromised hosts.

The central processor 218 may analyze the path that interconnects the predetermined compromised hosts on the communication graph to determine the compromised hosts 202 from among the hosts 202, 204.

According to an embodiment of the present application, the central processor 218 may determine that each of the hosts 202, 204 that is on a path that interconnects the predetermined compromised hosts is one of the compromised hosts 202. For example, in the exemplary communication graph shown in FIG. 3, if hosts 304, 306 are predetermined compromised hosts, the central processor 218 may determine that hosts 308, 310 are compromised hosts 202. In this regard, the central processor 218 may determine that only those hosts 202, 204 that are on a path that interconnects the predetermined compromised hosts are the compromised hosts 202.

In another embodiment of the present application, the central processor 218 may analyze the communication graph to determine at least one of the compromised hosts 202 that is not on a path that interconnects the predetermined compromised hosts. In this regard, the central processor 218 may determine the compromised hosts 202 that are not on a path that interconnects the predetermined compromised hosts based on a proximity of the unknown compromised host to the predetermined compromised hosts. For example, in the exemplary communication graph shown in FIG. 3, the central processor 218 may determine that hosts 312, 314 are compromised hosts 202.

In a further embodiment of the present application, the algorithm processor 222 may determine whether the communication graph defines at least one additional path that interconnects two of the compromised hosts 202 other than the predetermined compromised hosts. The additional path may include at least two of the peer-to-peer data flows for determining an additional, unknown compromised host that is between the two of the compromised hosts 202 other than the predetermined compromised hosts. In this regard, the central processor 218 may analyze the additional path that interconnects the compromised hosts 202 other than the predetermined compromised hosts on the communication graph to determine further compromised hosts 202 from among the hosts 202, 204. According to an embodiment of the present application, the central processor 218 may determine that each of the hosts 202, 204 that is on the additional path is one of the compromised hosts 202. For example, as shown in FIG. 3, if the central processor 218 determines that hosts 312, 314 are compromised hosts 202 based on their proximity to the predetermined compromised hosts 304, 306, the central processor 218 may determine that host 316 is one of the compromised hosts 202 since host 316 lies on a path that interconnects compromised hosts 312, 314.

Of course those skilled in the art appreciate that the above-described embodiments and examples are merely exemplary and that the central processor 218 may determine the compromised hosts 202 from among the hosts 202, 204 based on the predetermined compromised hosts, paths that interconnect the predetermined compromised hosts, and/or additional paths that interconnect compromised hosts 202 based upon additional, or alternative, methods. For example, probabilities may be assigned to the hosts 202, 204 based upon their proximity to the predetermined compromised hosts, paths that interconnect the predetermined compromised hosts, and/or additional paths that interconnect determined compromised hosts. Thereafter, the central processor 218 may determine the compromised hosts 202 from among the hosts 202, 204 based upon the assigned probabilities.

Furthermore, in additional embodiments of the present application, those skilled in the art appreciate that the compromised hosts 202 may be determined when less than two predetermined compromised hosts are known. For example, in an embodiment of the present application, the graphics processor 220 may graph the peer-to-peer data flows on the communication graph with each of the hosts 202, 204 being a node and each of the peer-to-peer data flows being an edge. In this regard, if at least one of the compromised hosts 202 is a predetermined compromised host, then the central processor 218 may analyze the communication graph to determine the compromised hosts 202 from among the hosts 202, 204 based upon a proximity to the predetermined compromised host or the predetermined compromised hosts.

In further embodiments of the present application, the system 200 may include a communication graph monitor 224 that monitors or tracks the communication graph over time. The communication graph monitor 224 may monitor the communication graph for a predetermined period of time in order to determine dynamic information of the compromised hosts 202. For example, the communication graph monitor 224 may determine peer list updates and/or new recruits over the predetermined period of time.

Figure 4:
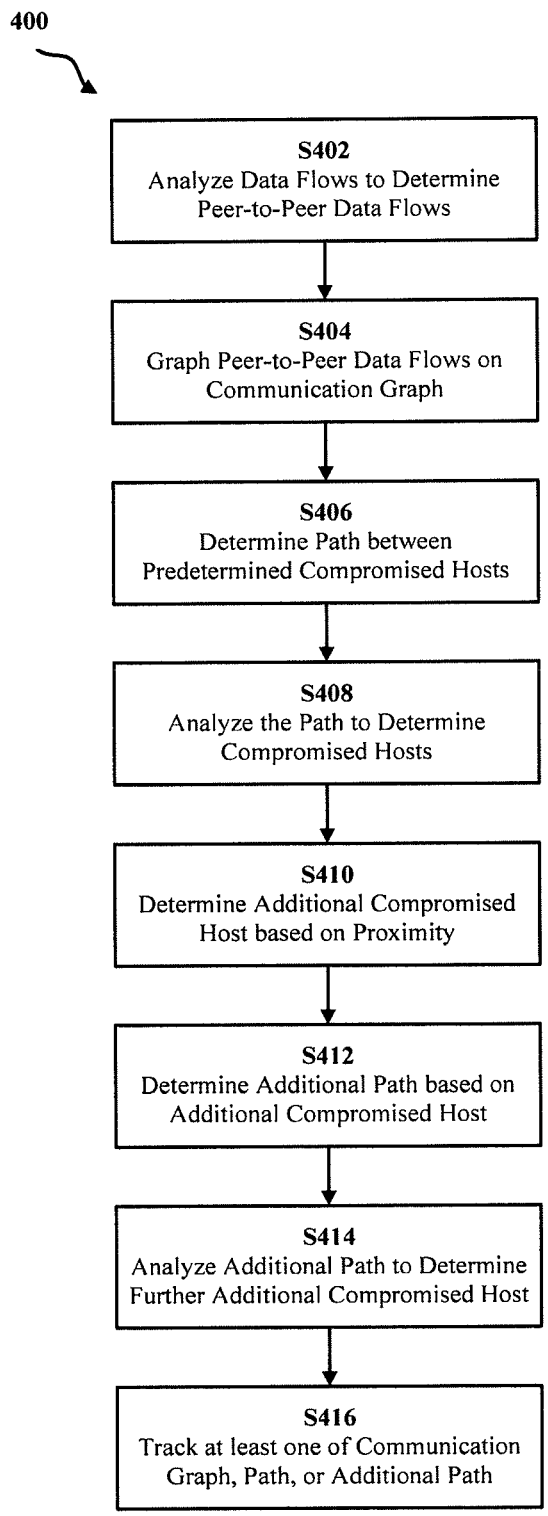
FIG. 4 is a flowchart of an exemplary method for analyzing backbone traffic to determine a plurality of compromised hosts from among a plurality of hosts on a network, according to an aspect of the present disclosure.

The present application further provides methods for analyzing backbone traffic to determine a plurality of compromised hosts from among a plurality of hosts on a network, wherein the backbone traffic includes a plurality of data flows. A non-limiting and exemplary method is generally shown at 400 in FIG. 4.

The method 400 analyzes, with a processor, each of the data flows included in the backbone traffic to determine a plurality of peer-to-peer data flows at S402. Each of the peer-to-peer data flows is one of the data flows that has a source address and a destination address that are each unassociated with a domain name.

According to an embodiment of the method 400, at least two of the compromised hosts are predetermined compromised hosts. In this regard, the peer-to-peer data flows are graphed on a communication graph with each of the hosts being a node and each of the peer-to-peer data flows being an edge at S404. At S406, it is determined whether the communication graph defines at least one path that interconnects the predetermined compromised hosts using a predetermined graph algorithm. The path includes at least two of the peer-to-peer data flows for determining at least one compromised host that lies on the path between the predetermined compromised hosts. The path is analyzed, with the processor, to determine the compromised hosts from among the hosts at S408. In this regard, according to an exemplary embodiment of the method 400, each host on the path may be determined to be a compromised host. Each of the compromised hosts is interconnected with another of the compromised hosts via at least one of the peer-to-peer data flows.

In an embodiment of the method 44, the processor may further analyze the communication graph to determine at least one additional compromised host that is not on the path that interconnects the predetermined compromised hosts at S410. According to an exemplary embodiment of the method 400, the additional compromised host may be determined based on a proximity to at least one of the predetermined compromised hosts. At S412, it is determined whether the communication graph defines at least one additional path that interconnects two of the compromised hosts other than the predetermined compromised hosts. The additional path includes at least two of the peer-to-peer data flows for determining a further additional compromised host. The additional path that interconnects the two of the compromised hosts other than the predetermined compromised hosts is analyzed to determine the further additional compromised host from among the hosts at S414 in response to determining that the communication graph defines an additional path. At least one of the communication graph, the path, and the additional path are tracked for a predetermined period of time to determine dynamic information of the compromised hosts and/or an even further additional compromised host at S416.

Figure 5:
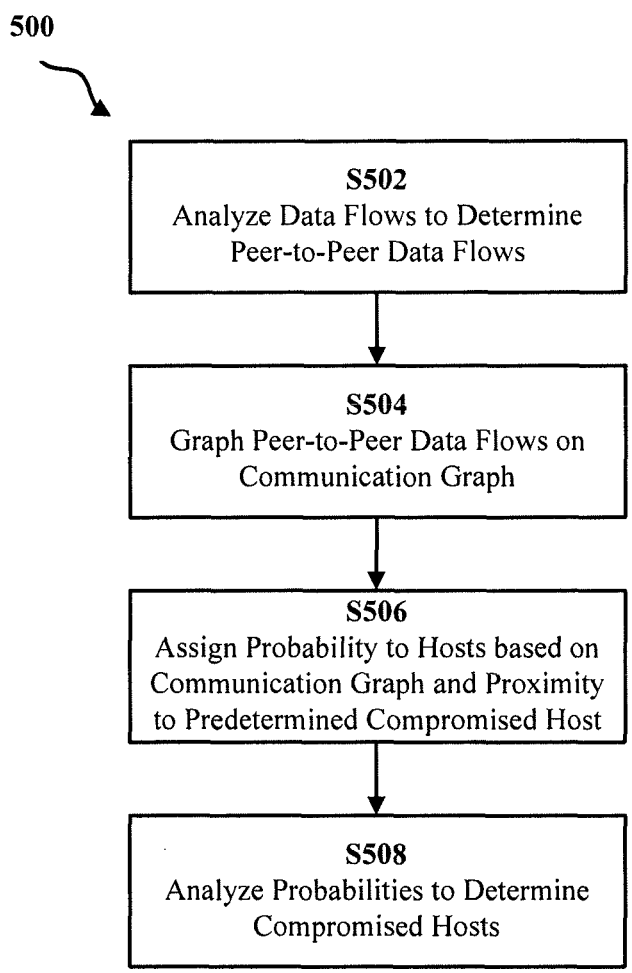
FIG. 5 is a flowchart of an exemplary method for analyzing backbone traffic to determine a plurality of compromised hosts from among a plurality of hosts on a network, according to an aspect of the present disclosure.

An additional embodiment of a method of the present application for analyzing backbone traffic to determine a plurality of compromised hosts from among a plurality of hosts on a network, wherein the backbone traffic includes a plurality of data flows, is generally shown at 500 in FIG. 5. According to the method 500, a processor analyzes each of the data flows included in the backbone traffic to determine a plurality of peer-to-peer data flows at S502. Each of the peer-to-peer data flows is one of the data flows that has a source address and a destination address that are each unassociated with a domain name.

According to an embodiment of the method 500, at least one of the compromised hosts is a predetermined compromised host. In this regard, the peer-to-peer data flows are graphed on a communication graph with each of the hosts being a node and each of the peer-to-peer data flows being an edge at S504. At S506, a probability is assigned to each of the hosts based on the communication graph and a proximity of each of the hosts to the predetermined compromised host. Each of the hosts is analyzed based on the assigned probability to determine the compromised hosts at S508. In this regard, each host may be analyzed to determined whether the assigned probability is greater than a predetermined threshold amount, or each host may be analyzed based on the assigned probability in comparison to the assigned probabilities of the other hosts.

Of course, those skilled in the art appreciate that the above-described embodiments of the methods 400, 500 are merely exemplary and are not meant to be limiting or exhaustive. The scope of the present application includes additional methods which may include any combination of features as discussed above with respect to the system 200.

The present application further provides a non-transitory computer-readable medium 182 that includes an executable program for analyzing backbone traffic to determine a plurality of compromised hosts from among a plurality of hosts on a network. The backbone traffic includes a plurality of data flows. The non-transitory computer-readable medium 182 includes a resolving code segment that, when executed, analyzes each of the data flows included in the backbone traffic to determine a plurality of peer-to-peer data flows. Each of the peer-to-peer data flows is one of the data flows that has a source address and a destination address that are each unassociated with a domain name. In this regard, as discussed above in regards to the system 200, the resolving code segment may analyze each of the data flows to determine the peer-to-peer data flows by searching a database of domain name system records and/or performing reverse domain name system queries.

The computer-readable medium 182 includes a peer-to-peer data flow analyzing code segment that, when executed, analyzes the peer-to-peer data flows to determine the compromised hosts from among the hosts. Each of the compromised hosts determined as being interconnected with another of the compromised hosts via at least one of the peer-to-peer data flows.

According to an embodiment of the present application the computer-readable medium 182 includes a graphing code segment that, when executed, graphs the peer-to-peer data flows on a communication graph, and a path determining code segment that, when executed, determines, with a predetermined graph algorithm, whether the communication graph defines at least one path that interconnects predetermined compromised hosts, wherein the path includes at least two of the peer-to-peer data flows. In this regard, the peer-to-peer data flow analyzing code segment analyzes the path that interconnects the predetermined compromised hosts on the communication graph to determine the compromised hosts from among the hosts in response to the path determining code segment determining that the communication path defines the path.

In further embodiments of the present application, as discussed above, the peer-to-peer data flow analyzing code segment determines the compromised hosts based on a proximity to at least one of predetermined compromised host. Furthermore, the path determining code segment may further determine whether the communication graph defines at least one additional path that interconnects compromised hosts other than the predetermined compromised hosts, and the peer-to-peer data flow analyzing code segment may analyze the additional path to determine the compromised hosts.

Of course, those skilled in the art appreciate that the above-described embodiments of the computer-readable medium 182 are merely exemplary and are not meant to be limiting or exhaustive. The scope of the present application includes additional embodiments of the computer-readable medium 182 which includes an executable computer program which may execute any combination of features as discussed above with respect to the system 200. For example, the computer-readable medium 182 may include a graphing code segment that, when executed, graphs the peer-to-peer data flows on a communication graph with each of the hosts being a node and each of the peer-to-peer data flows being an edge. According to such an exemplary embodiment, at least one of the compromised hosts is a predetermined compromised host, and the peer-to-peer data flow analyzing code segment of the computer-readable medium 182 analyzes the communication graph to determine the compromised hosts based on a proximity to the predetermined compromised host.

Accordingly, the present application enables detection and tracking of bots in a peer-to-peer botnet by analyzing flow data in backbone traffic. The present application expands the capability and capacity of current botnet detection algorithms by incorporating detection of complex peer-to-peer botnets. The systems, methods, and computer-readable media provide passive analysis techniques that do not impose latencies on real network traffic. The systems, methods, and computer-readable media are capable of performing analysis on backbone traffic that processes terra bytes of data. Furthermore, the systems, methods, and computer-readable media enable real time tracking of peer-to-peer botnet topology and their evolution over time; consequently fueling research on botnet mitigation methods.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the systems, methods, and computer-readable media area described as being for analyzing backbone traffic. However, those skilled in the art appreciate that the techniques disclosed herein may be employed to monitor any type of network traffic.

While the computer-readable medium 182 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium 182 can include a solid-state memory such as a memory card or other package that houses one or more non-volatile read-only memories. Further, the computer-readable medium 182 can be a random access memory or other volatile re-writable memory. Additionally, the computer-readable medium 182 can include a magneto-optical or optical medium, such as a disk or tapes or other storage device to capture carrier wave signals such as a signal communicated over a transmission medium. Accordingly, the disclosure is considered to include any computer-readable medium 182 or other equivalents and successor media, in which data or instructions may be stored.

Although the present specification describes components and functions that may be implemented in particular embodiments with reference to particular standards and protocols, the disclosure is not limited to such standards and protocols. For example, the present application discloses that peer-to-peer data flows are identified as having a source address and a data address that are each unassociated with a domain name. Of course, those skilled in the art appreciate that the peer-to-peer data flows may additionally, or alternatively, be identified as having a source address and a destination address that are each unassociated with a hostname, or any other identifier that may be stored in association with an location identifier in a sever and/or database. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for analyzing backbone traffic to determine a plurality of compromised hosts from among a plurality of hosts on a network, the backbone traffic including a plurality of data flows, the method comprising:
    analyzing, with a processor, each of the plurality of data flows included in the backbone traffic to determine a plurality of peer-to-peer data flows, each of the plurality of peer-to-peer data flows being one of the plurality of data flows and having a source address and a destination address that are each unassociated with a domain name wherein each of the plurality of data flows is analyzed to determine the plurality of peer-to-peer data flows by searching a database of domain name system records to determine whether the source address and the destination address of each of the plurality of data flows are each unassociated with any domain name; and
    analyzing, with the processor, the plurality of peer-to-peer data flows to determine the plurality of compromised hosts from among the plurality of hosts, each of the plurality of compromised hosts being interconnected with another of the plurality of compromised hosts via at least one of the plurality of peer-to-peer data flows.

2. The method according to claim 1, wherein at least two of the plurality of compromised hosts are predetermined compromised hosts, wherein the plurality of peer-to-peer data flows is analyzed to determine at least one path that interconnects the predetermined compromised hosts, the at least one path including at least two of the plurality of peer-to-peer data flows, and wherein the plurality of compromised hosts are on the at least one path that interconnects the predetermined compromised hosts.

3. The method according to claim 1, wherein at least two of the plurality of compromised hosts are predetermined compromised hosts, wherein the plurality of peer-to-peer data flows are graphed on a communication graph with each of the plurality of hosts being a node and each of the plurality of peer-to-peer data flows being an edge, wherein a predetermined graph algorithm determines whether the communication graph defines at least one path that interconnects the predetermined compromised hosts, the at least one path including at least two of the plurality of peer-to-peer data flows, and wherein the at least one path that interconnects the predetermined compromised hosts on the communication graph is analyzed to determine the plurality of compromised hosts from among the plurality of hosts in response to determining that the communication graph defines the at least one path.

4. The method according to claim 3, wherein at least one of the plurality of compromised hosts is not on a path that interconnects the predetermined compromised hosts, the at least one of the plurality of compromised hosts determined based on a proximity to at least one of the predetermined compromised hosts.

5. The method according to claim 4, further comprising:
determining whether the communication graph defines at least one additional path that interconnects two of the plurality of compromised hosts other than the predetermined compromised hosts, the at least one additional path including at least two of the plurality of peer-to-peer data flows; and
analyzing the at least one additional path that interconnects the two of the plurality of compromised hosts other than the predetermined compromised hosts to determine the plurality of compromised hosts from among the plurality of hosts in response to determining that the communication graph defines the at least one additional path.

6. The method according to claim 3, further comprising:
assigning a probability to each of the plurality of hosts that is located on the at least one path based upon a relationship with one of the at least one path and the predetermined compromised hosts in response to determining that the communication graph defines the at least one path, wherein the probability of each of the plurality of hosts that is located on the at least one oath is analyzed to determine the plurality of compromised hosts from among the plurality of hosts.

7. The method according to claim 3, further comprising:
tracking the at least one path for a predetermined period of time to determine at least one of dynamic information of the plurality of compromised hosts and at least one additional compromised host in response to determining that the communication graph defines the at least one path.

8. The method according to claim 1, further comprising:
graphing the plurality of peer-to-peer data flows on a communication graph with each of the plurality of hosts being a node and each of the plurality of peer-to-peer data flows being an edge,
wherein at least one of the plurality of compromised hosts is a predetermined compromised host, and
wherein the communication graph is analyzed to determine the plurality of compromised hosts based on a proximity to the predetermined compromised host.

9. The method according to claim 1, wherein each of the plurality of data flows is analyzed to determine the plurality of peer-to-peer data flows by performing reverse domain name system queries to determine whether the source address and the destination address of each of the plurality of data flows are each unassociated with any domain name.

10. A non-transitory computer-readable medium including an executable program for analyzing backbone traffic to determine a plurality of compromised hosts from among a plurality of hosts on a network, the backbone traffic including a plurality of data flows, the non-transitory computer-readable medium comprising:
a resolving code segment that, when executed, analyzes each of the plurality of data flows included in the backbone traffic to determine a plurality of peer-to-peer data flows, each of the plurality of peer-to-peer data flows being one of the plurality of data flows that has a source address and a destination address that are each unassociated with a domain name wherein each of the plurality of data flows is analyzed to determine the plurality of peer-to-peer data flows by searching a database of domain name system records to determine whether the source address and the destination address of each of the plurality of data flows are each unassociated with any domain name; and
a peer-to-peer data flow analyzing code segment that, when executed, analyzes the plurality of peer-to-peer data flows to determine the plurality of compromised hosts from among the plurality of hosts, each of the plurality of compromised hosts being interconnected with another of the plurality of compromised hosts via at least one of the plurality of peer-to-peer data flows.

11. The non-transitory computer-readable medium according to claim 10, wherein at least two of the plurality of compromised hosts are predetermined compromised hosts, wherein a graphing code segment, when executed, graphs the plurality of peer-to-peer data flows on a communication graph with each of the plurality of hosts being a node and each of the plurality of peer-to-peer data flows being an edge, and wherein a path determining code segment, when executed, determines, with a predetermined graph algorithm, whether the communication graph defines at least one path that interconnects the predetermined compromised hosts, the at least one path including at least two of the plurality of peer-to-peer data flows, and
wherein the peer-to-peer data flow analyzing code segment analyzes the at least one path that interconnects the predetermined compromised hosts on the communication graph to determine the plurality of compromised hosts from among the plurality of hosts in response to the path determining code segment determining that the communication path defines the at least one path.

12. The non-transitory computer-readable medium according to claim 11, wherein at least one of the plurality of compromised hosts is not on a path that interconnects the predetermined compromised hosts, the peer-to-peer data flow analyzing code segment determining the at least one of the plurality of compromised hosts based on a proximity to at least one of the predetermined compromised hosts.

13. The non-transitory computer-readable medium according to claim 12, wherein the path determining code segment further determines whether the communication graph defines at least one additional path that interconnects two of the plurality of compromised hosts other than the predetermined compromised hosts, the at least one additional path including at least two of the plurality of peer-to-peer data flows, and wherein the peer-to-peer data flow analyzing code segment analyzes the at least one additional path that interconnects the two of the plurality of compromised hosts other than the predetermined compromised hosts to determine the plurality of compromised hosts from among the plurality of hosts in response to the path determining code segment determining that the communication path defines the at least one additional path.

14. The non-transitory computer-readable medium according to claim 10, further comprising:
a graphing code segment that, when executed, graphs the plurality of peer-to-peer data flows on a communication graph with each of the plurality of hosts being a node and each of the plurality of peer-to-peer data flows being an edge,
wherein at least one of the plurality of compromised hosts is a predetermined compromised host, and
wherein the peer-to-peer data flow analyzing code segment analyzes the communication graph to determine the plurality of compromised hosts based on a proximity to the predetermined compromised host.

15. A system for analyzing backbone traffic to determine a plurality of compromised hosts from among a plurality of hosts on a network, the backbone traffic including a plurality of data flows, the system comprising:
a resolver that analyzes each of the plurality of data flows included in the backbone traffic to determine a plurality of peer-to-peer data flows, each of the plurality of peer-to-peer data flows being one of the plurality of data flows that has a source address and a destination address that are each unassociated with a domain name wherein each of the plurality of data flows is analyzed to determine the plurality of peer-to-peer data flows by searching a database of domain name system records to determine whether the source address and the destination address of each of the plurality of data flows are each unassociated with any domain name; and
a central processor that analyzes the plurality of peer-to-peer data flows to determine the plurality of compromised hosts from among the plurality of hosts, each of the plurality of compromised hosts being interconnected with another of the plurality of compromised hosts via at least one of the plurality of peer-to-peer data flows.

16. The system according to claim 15, wherein at least two of the plurality of compromised hosts are predetermined compromised hosts, wherein a graphics processor graphs the plurality of peer-to-peer data flows on a communication graph with each of the plurality of hosts being a node and each of the plurality of peer-to-peer data flows being an edge, and wherein an algorithm processor executes a predetermined graph algorithm to determine whether the communication graph defines at least one path that interconnects the predetermined compromised hosts, the at least one path including at least two of the plurality of peer-to-peer data flows, and wherein the central processor analyzes the at least one path that interconnects the predetermined compromised hosts on the communication graph to determine the plurality of compromised hosts from among the plurality of hosts in response to the algorithm processor determining that the communication path defines the at least one path.

17. The system according to claim 16, wherein at least one of the plurality of compromised hosts is not on a path that interconnects the predetermined compromised hosts, the central processor determining the at least one of the plurality of compromised hosts based on a proximity to at least one of the predetermined compromised hosts.

18. The system according to claim 17, wherein the algorithm processor determines whether the communication graph defines at least one additional path that interconnects two of the plurality of compromised hosts other than the predetermined compromised hosts, the at least one additional path including at least two of the plurality of peer-to-peer data flows, and wherein the central processor analyzes the at least one additional path that interconnects the two of the plurality of compromised hosts other than the predetermined compromised hosts to determine the plurality of compromised hosts from among the plurality of hosts in response to the algorithm processor determining that the communication path defines the at least one additional path.

19. The system according to claim 15, further comprising:
a graphics processor that graphs the plurality of peer-to-peer data flows on a communication graph with each of the plurality of hosts being a node and each of the plurality of peer-to-peer data flows being an edge,
wherein at least one of the plurality of compromised hosts is a predetermined compromised host, and
wherein the central processor analyzes the communication graph to determine the plurality of compromised hosts based on a proximity to the predetermined compromised host.

* * * * *